US012605880B2

(12) United States Patent　　(10) Patent No.:　US 12,605,880 B2
Felkins, Jr. et al.　　　　　　　(45) Date of Patent:　　Apr. 21, 2026

(54) PACKAGING CONTAINER MANUFACTURING SYSTEM AND METHOD

(71) Applicant: RING CONTAINER TECHNOLOGIES, LLC, Oakland, TN (US)

(72) Inventors: Billy Ray Felkins, Jr., Valdosta, GA (US); Robert Charles Graefe, Jr., Deland, FL (US)

(73) Assignee: Ring Container Technologies, LLC, Oakland, TN (US)

( * ) Notice: Subject to any disclaimer, the term of this patent is extended or adjusted under 35 U.S.C. 154(b) by 267 days.

(21) Appl. No.: 18/350,979

(22) Filed: Jul. 12, 2023

(65) Prior Publication Data

US 2025/0018638 A1　　Jan. 16, 2025

(51) Int. Cl.
　　*B29C 59/02*　　(2006.01)
　　*B29C 49/42*　　(2006.01)
　　*B29C 49/64*　　(2006.01)
　　*B29L 31/00*　　(2006.01)

(52) U.S. Cl.
　　CPC ........ *B29C 59/021* (2013.01); *B29C 49/4278* (2013.01); *B29C 49/6605* (2022.05); *B29L 2031/7158* (2013.01)

(58) Field of Classification Search
　　CPC ....... B29C 57/02; B29C 57/12; B29C 57/125; B29C 53/22; B29C 53/305; B29L 2031/7158
　　See application file for complete search history.

(56) References Cited

U.S. PATENT DOCUMENTS

| | | | | |
|---|---|---|---|---|
| 3,612,326 A | * | 10/1971 | Marks ................... | B29C 66/112 |
| | | | | 215/44 |
| 6,085,942 A | * | 7/2000 | Redmond .......... | B65D 77/2052 |
| | | | | 206/820 |
| 6,207,100 B1 | * | 3/2001 | Weiss ...................... | B29C 51/32 |
| | | | | 220/366.1 |
| 6,506,330 B1 | * | 1/2003 | Schweigert ......... | B29C 45/4421 |
| | | | | 264/318 |
| 6,571,986 B1 | * | 6/2003 | Simmons ................ | B67C 7/002 |
| | | | | 156/449 |
| D833,286 S | * | 11/2018 | Ogg ............................... | D9/569 |
| 2005/0159284 A1 | * | 7/2005 | Smith ................... | B31B 50/592 |
| | | | | 493/143 |
| 2005/0200053 A1 | * | 9/2005 | Schutz .................... | B29C 49/60 |
| | | | | 264/540 |
| 2007/0082151 A1 | * | 4/2007 | Hatano ................. | B29C 66/114 |
| | | | | 428/35.7 |
| 2008/0263942 A1 | * | 10/2008 | Hansen ................. | B29C 51/325 |
| | | | | 47/65.5 |
| 2009/0246428 A1 | * | 10/2009 | Shimizu ............... | B65D 1/0276 |
| | | | | 264/523 |

(Continued)

*Primary Examiner* — Andrew D Graham

(74) *Attorney, Agent, or Firm* — Sorell, Lenna & Schmidt, LLP

(57)　　　　　　ABSTRACT

A method for manufacturing a packaging container comprises the steps of molding an article having a selected configuration and including a body defining a volume, a neck and a dome; trimming the article to remove the dome to form a finished container; aligning the finished container with a device having at least one heated rib; and engaging the at least one heated rib with the neck to form at least one vent. Containers and systems are disclosed.

20 Claims, 13 Drawing Sheets

10

(56)　　　　　　References Cited

U.S. PATENT DOCUMENTS

| | | | | |
|---|---|---|---|---|
| 2012/0045554 | A1* | 2/2012 | Carvin | B29C 66/131 |
| | | | | 426/106 |
| 2013/0043202 | A1* | 2/2013 | Wurster | B65D 1/0276 |
| | | | | 53/467 |
| 2013/0081737 | A1* | 4/2013 | Bassani | B65B 43/42 |
| | | | | 141/283 |
| 2013/0207318 | A1* | 8/2013 | Britton | B65D 1/40 |
| | | | | 264/523 |
| 2017/0021552 | A1* | 1/2017 | Dygert | B29B 11/08 |
| 2021/0129409 | A1* | 5/2021 | Kelley | B29C 49/4273 |
| 2021/0229853 | A1* | 7/2021 | Dygert | B65D 79/0081 |
| 2022/0305688 | A1* | 9/2022 | Mammolenti | B65G 47/90 |
| 2025/0018638 | A1* | 1/2025 | Felkins, Jr. | B29C 49/6605 |

* cited by examiner

46

36

38

40

48

PACKAGING CONTAINER MANUFACTURING SYSTEM AND METHOD

TECHNICAL FIELD

The present disclosure generally relates to devices and methods for making vents in containers.

BACKGROUND

Plastic containers are commonly used for food packaging products. Many food and beverage products are sold to the consuming public in containers, including blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

These food packaging containers are adapted to store food packaging products, however, during manufacturing and depending on the type of food being stored in the container, the container may need to be vented. For example, a container can be vented as a safety feature so that gas from an inside of the container is released into the atmosphere prior to a lid being removed from the container. A container can also be vented to facilitate the escape of steam from the inside of the container and into the atmosphere when the container is filled with a hot product during manufacture. This disclosure describes an improvement over these prior technologies.

SUMMARY

In one embodiment, a method for manufacturing a packaging container is provided. The method comprises the steps of molding an article having a selected configuration and including a body defining a volume, a neck and a dome; trimming the article to remove the dome to form a finished container; aligning the finished container with a device having at least one heated rib; and engaging the at least one heated rib with the neck to form at least one vent. In some embodiments, containers and systems are disclosed.

In one embodiment, a container manufacturing system is provided. The system comprises a mold apparatus configured to form an article having a selected configuration and including a body defining a volume, a neck and a dome. A trimmer is engageable with the article to remove the dome from the article to form a finished container. A feed-screw and a conveyor support the finished container along a selected path. A device includes at least one heated rib. A clamp is provided that aligns the neck with the at least one heated rib such that the at least one heated rib is engageable with the neck to form at least one vent.

In one embodiment, a method for manufacturing a packaging container is provided. The method comprising the steps of molding an article having a selected configuration and including a body defining a volume, a neck having a sealing surface and a dome; trimming the article to remove the dome to form a finished container; transferring the finished container to a device along a linear path via a feed-screw and a conveyor, the device having a plurality of heated ribs and an actuator configured to move the plurality of ribs; aligning the sealing surface with the plurality of ribs; and engaging the plurality of ribs with the sealing surface to form a plurality of vents.

BRIEF DESCRIPTION OF THE DRAWINGS

The present disclosure will become more readily apparent from the specific description accompanied by the following drawings, in which.

DETAILED DESCRIPTION

Figure 1:
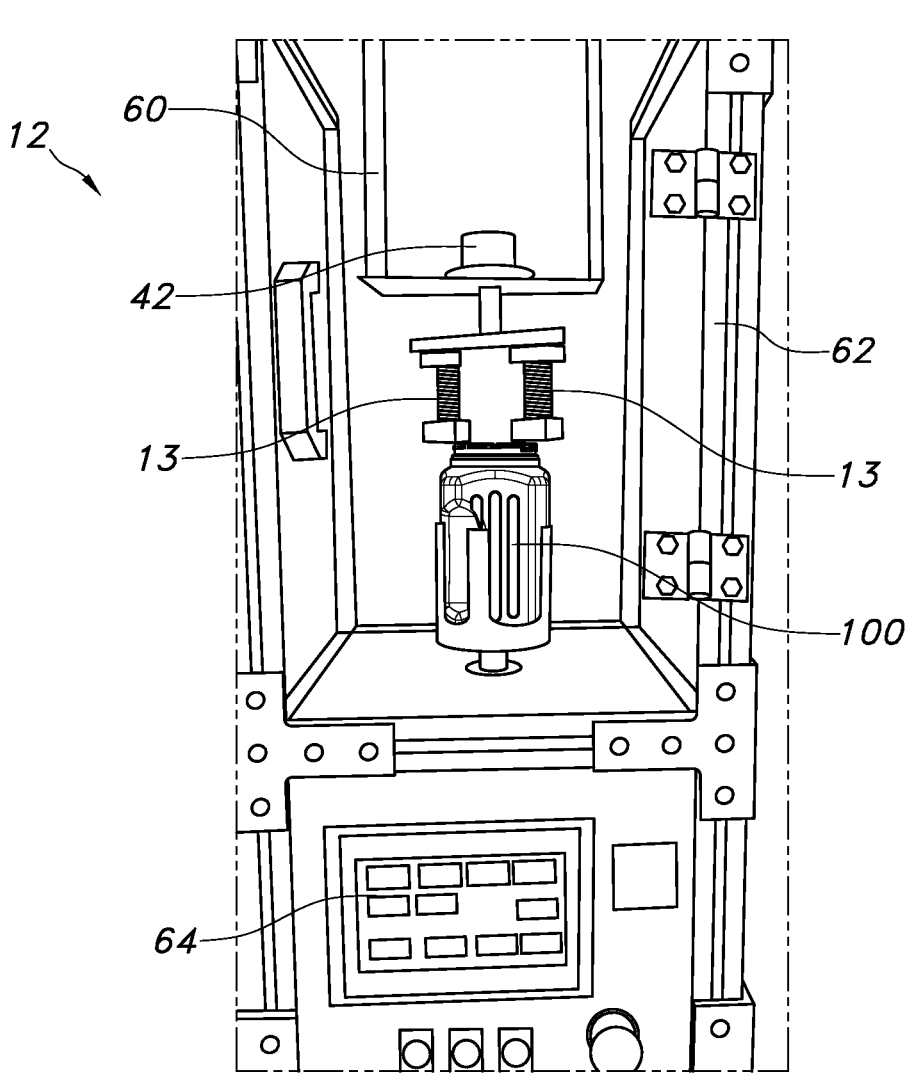
FIG. 1 is a perspective view of one embodiment of components of a container manufacturing system in accordance with the principles of the present disclosure.

The exemplary embodiments of devices and methods for making containers and more particularly, containers discussed in terms of food packaging products. In some embodiments, the present system and method are configured to create a vent in a finished container. In some embodiments, the present system and method include manufacturing devices that can have a tool configured to form one or more vents in a finish, for example, a blown-neck finish closure for products that require a breathable container. In some embodiments, the system and method are configured to form a sealing surface vent to any neck finish in a post-trim process.

In some embodiments, the present system and method are configured to produce one or more vents in a section of a container sealing surface. In some embodiments, the system includes a device, for example, a manufacturing device that includes a heated tool configured to form one or more vents in a section of the container finish. In some embodiments, the tool is configured to create one or more vents in a container finish without in-mold accommodations or venting features in a closure. In some embodiments, the tool is configured to form vents in a sealing surface of a container.

In some embodiments, the present system and method include a heated tool configured to form vents in a container. In some embodiments, the tool applies heat to one or more locations in a portion, for example, a sealing surface of a neck finish of the container to alter topography of the sealing surface by deforming the sealing surface to create a vent pathway into the container. In some embodiments, the tool includes an end that is configured in a selected shape, for example, a wedge. In some embodiments, the tool includes four wedges configured to form four vents within the sealing surface. In some embodiments, the amount and shape of the wedge can vary depending on application. In some embodiments, the system includes a device, including a machine to load a container into a positioning/locating mechanism, along with actuating the tool. In some embodiments, the present system includes clamping plates.

In some embodiments, the present disclosure includes a method of manufacturing a container. The method includes the steps of implementing one or more machines to load, position, and/or discharge a container. In some embodiments, the one or more machines include a feed-screw system and/or a conveyor belt. In some embodiments, the feed-screw system and/or the conveyor belt are operated by a motor, for example, a dual servo-driven motor. In some embodiments, the dual servo-driven feed-screw system is oriented parallel to the conveyor belt. In some embodiments, the method includes the step of implementing an air actuated clamping plate. In some embodiments, the clamping plate is configured to be mounted above the feed-screw. In some embodiments, the clamping plate translates perpendicular to the conveyor belt and engages with the container below threads of the container neck. In some embodiments, the method includes the step of implementing a heated tool. In some embodiments, the system includes one or more heated tools and an actuator. In some embodiments, the actuator is spring loaded. In some embodiments, the actuator is spring loaded in a direction, for example, a downward direction, using an air cylinder to lift the tool into an idle position. In some embodiments, the tool includes a heater element that is controlled by a heater controller, and four wedges attached to a bottom of the plate. In some embodiments, the wedge forms a vent into the container. In some embodiments, the wedge includes a selected width configured to form a selected vent width. In some embodiments, the wedge includes a plurality of wedges arranged radially and the wedges slope in an opposite direction from a center of the container. In some embodiments, a programmable logic controller (PLC) is implemented to control timing and duration of all actuations of one or more manufacturing devices of the system, as described herein.

In some embodiments, the present system includes a rotary machine configured to facilitate a high throughput of containers for a selected amount of heated tools. In some embodiments, the rotary machine includes a continuous rotational machine and/or a rotary index machine. In some embodiments, the present system includes a continuous motion linear machine. In some embodiments, the conveyor includes a loading mechanism, including a belt drive, servo driven conveyor, and/or photo-eye driven stop gates. In some embodiments, a clamping mechanism may or may not be employed depending on the precision required for vent locations and can be driven by other methods such linear servos, belt drives, and/or toggle locks. In some embodiments, the manufacturing device can include a drive mechanism actuated by varying methods. In some embodiments, the tool is variously configured in different shapes and the heated wedge is pushed into the finish of the container to form a vent.

In some embodiments, the present method of manufacturing a container includes the steps of forming the container via blow molding. In some embodiments, the method includes the step of trimming the container in a trimming machine. In some embodiments, the method includes the step of transferring the container into a vent forming machine via a feed-screw and a conveyor. In some embodiments, the method includes the step of securing the container to a clamping plate. In some embodiments, the container is secured to the clamping plate below threads of the container. In some embodiments, the method comprises the step of forming one or more vents with a heated tool of the vent forming machine. In some embodiments, a head, for example, a rib of the tool is translated to contact the container and spring pressure on the tool molds a vent into the plastic of the container as the tool is heated. In some embodiments, the method comprises the step of removing the container from the machine. In some embodiments, the tool is retracted and the container is transferred out of the machine via the feed-screw and conveyor.

In some embodiments, the present system comprises a manufacturing device including a heated tool having a plurality of wedges configured to form vents within a sealing surface of a container. In some embodiments, the tool is mounted to an external frame of a machine via adjustable mounts to allow for varying container dimensions. In some embodiments, the frame incorporates external guarding and doors that include safety switches. In some embodiments, the manufacturing device includes servos, solenoids, sensors, and safety devices that are controlled by a PLC incorporated into line controls. In some embodiments, the manufacturing device is employed in line on a standard PET blow-trim line. In some embodiments, the manufacturing device overlaps a conveyor and is in line after a trimmer. In some embodiments, the manufacturing device is fully automated and includes in line controls and will activate when a selected amount of backlog of containers is present and the manufacturing device will shut down if there is a jam on the line, if there is not enough backlog, or if there is not enough room on a discharge side of the manufacturing device. In some embodiments, once conditions are met, the manufacturing device will automatically load, clamp, vent, and then discharge finished containers.

In some embodiments, the present system includes a container that is employed with a method for manufacturing food packaging having the ability to produce food packages made from PET with minimal weight and selectively desirable physical performance features, as described herein.

In some embodiments, the present system includes a container that is manufactured with selective physical performance features, for example, a reduction in plastic weight, a selected pre-form design, selected bottle processing and/or bottle crystallinity of a circumferential side wall of a blown container of the present container. In some embodiments, the selected physical performance features can include a higher injection molding efficiency and/or cavitation and an increased bi-axial orientation of PET container material. In some embodiments, the present container is manufactured with a smaller diameter preform, which forms a final bottle neck finish through the blowing process that allows for higher injection mold efficiency as well as improved material orientation throughout the container. In some embodiments, the container includes a container with an improved material distribution and crystalline orientation. In some embodiments, the manufacturing method provides a container having improved top load, vacuum resistance and/or permeability. In some embodiments, the manufacturing method provides stretching PET to optimum crystalline orientation levels to improve physical performance in top load, vacuum, gas and vapor permeation through the container side wall.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a container manufacturing system. Alternate embodiments are also disclosed. Reference is made in detail to the exemplary embodiments of the present disclosure, which are illustrated in the accompanying figures. Turning to FIGS. 1-19, there are illustrated components of a container manufacturing system 10. Container manufacturing system 10 is configured to form one or more vents, described herein in a container 100, as shown in FIG. 17.

Figure 2:
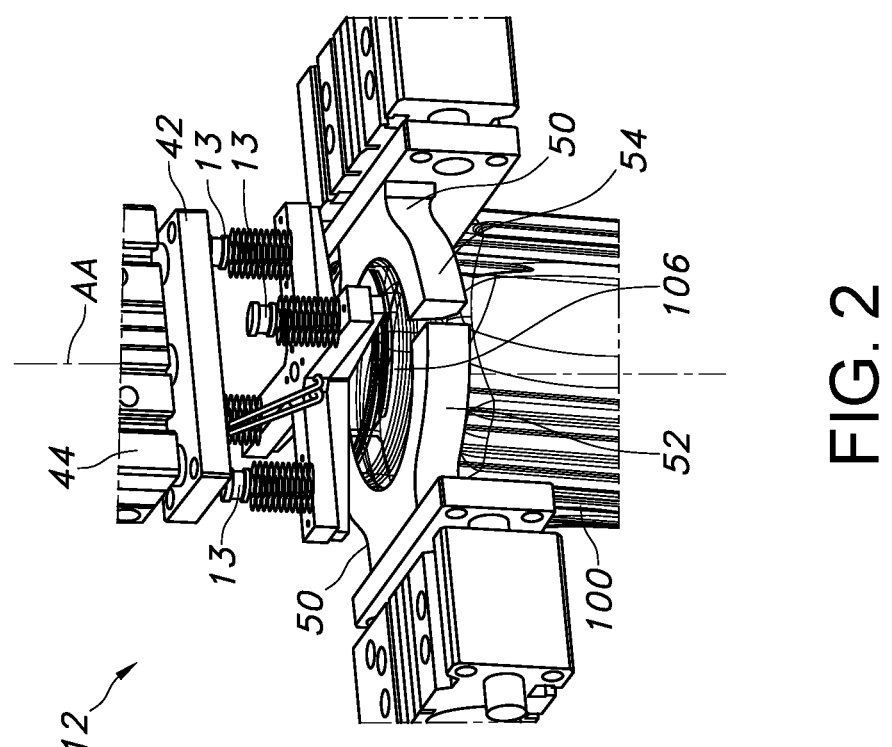
FIG. 2 is a perspective view of one embodiment of components of a container manufacturing system in accordance with the principles of the present disclosure.
Figure 4:
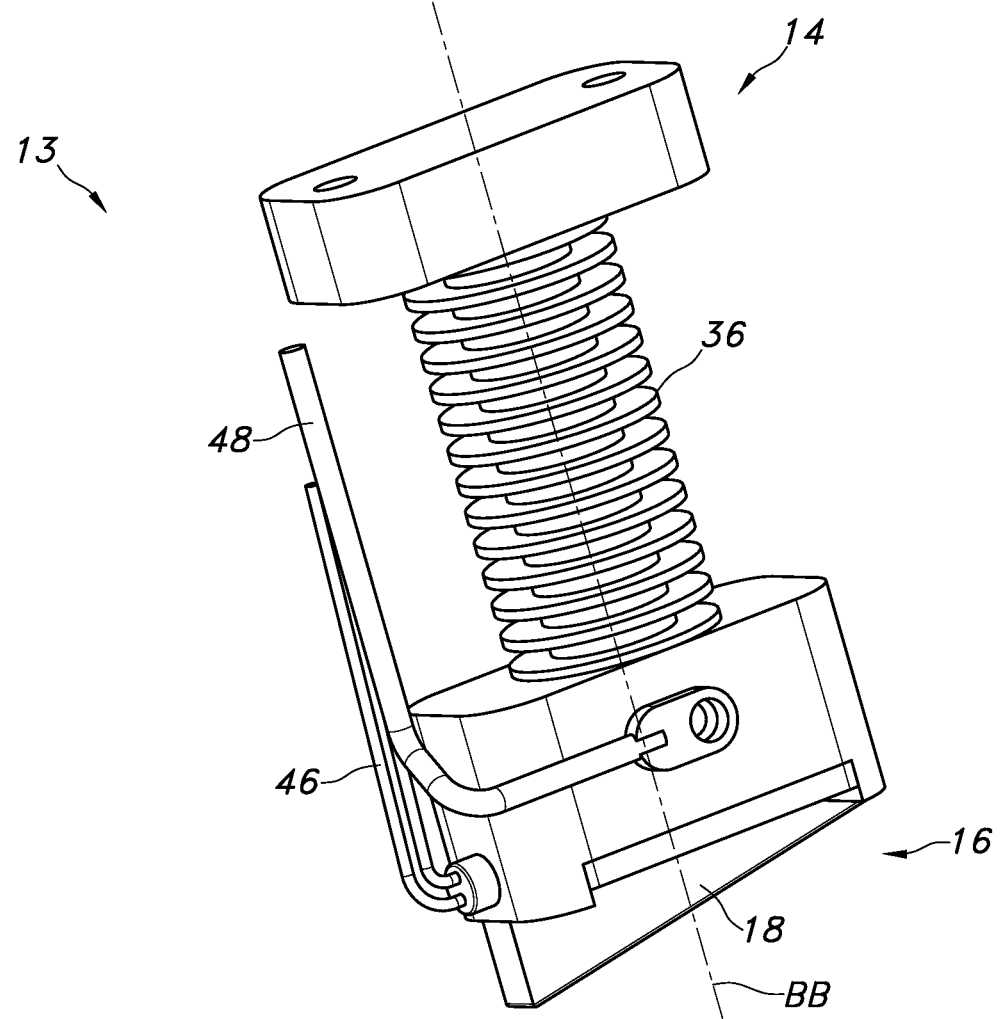
FIG. 4 is a perspective view of components of the system shown in FIG. 1.
Figure 6:
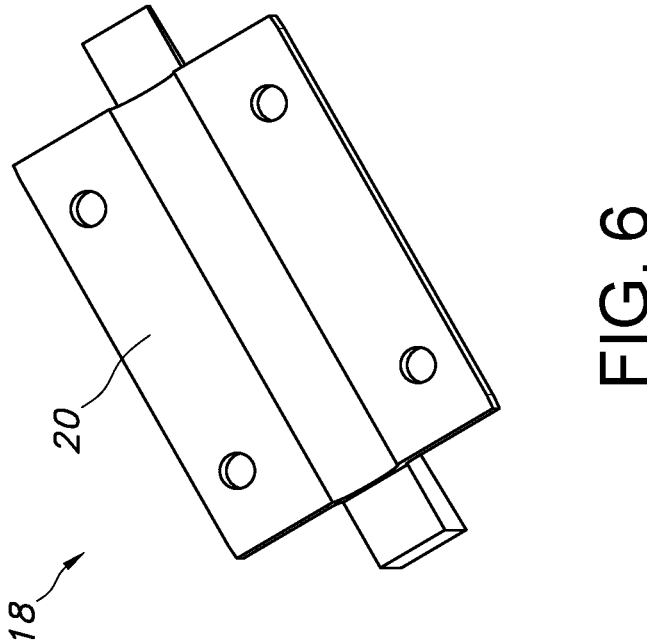
FIG. 6 is a perspective view of the component of the system shown in FIG. 5.
Figure 5:
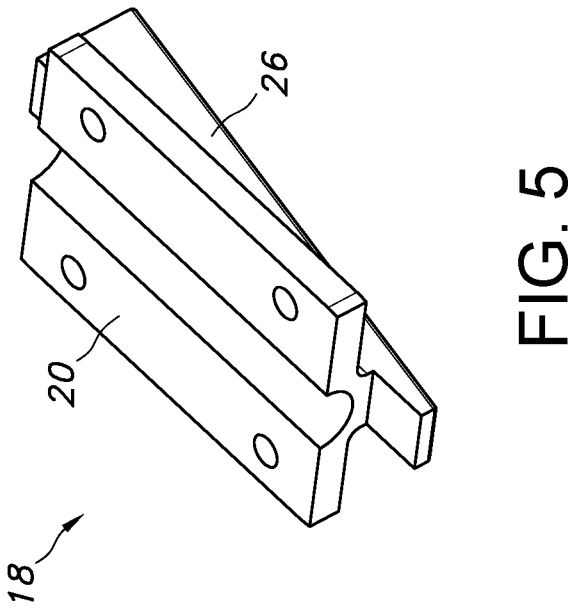
FIG. 5 is a perspective view of a component of the system shown in FIG. 1.

Container manufacturing system 10 includes a manufacturing device 12, as shown in FIGS. 1 and 2, configured to form at least one vent 104 in a surface of a container 100, as described herein. Manufacturing device 12 defines a central longitudinal axis AA, shown in FIG. 2. Manufacturing device 12 includes a tool 13 extending between a proximal end 14 and a distal end 16, and defines a longitudinal axis BB, as shown in FIG. 4. Axis BB is parallel relative to axis AA. End 14 includes a heater block 36, described herein, and end 16 includes a heated rib 18 configured to form at least one vent 104 in a surface of container 100.

Rib 18 includes a top surface 20, a bottom surface 22, a side 24, a side 26, an outer end 28 and an outer end 30, shown in FIGS. 4-9. Top surface 20 is configured for engagement with an end 40 of heater block 36, and bottom surface 22 is configured for engagement with a surface of container 100 to form at least one vent 104 in container 100. In some embodiments, surfaces 20, 22 can include various surface configurations including smooth, rough, textured, porous, semi-porous, dimpled, knurled, toothed, raised, grooved and/or polished.

Figures 7, 8:
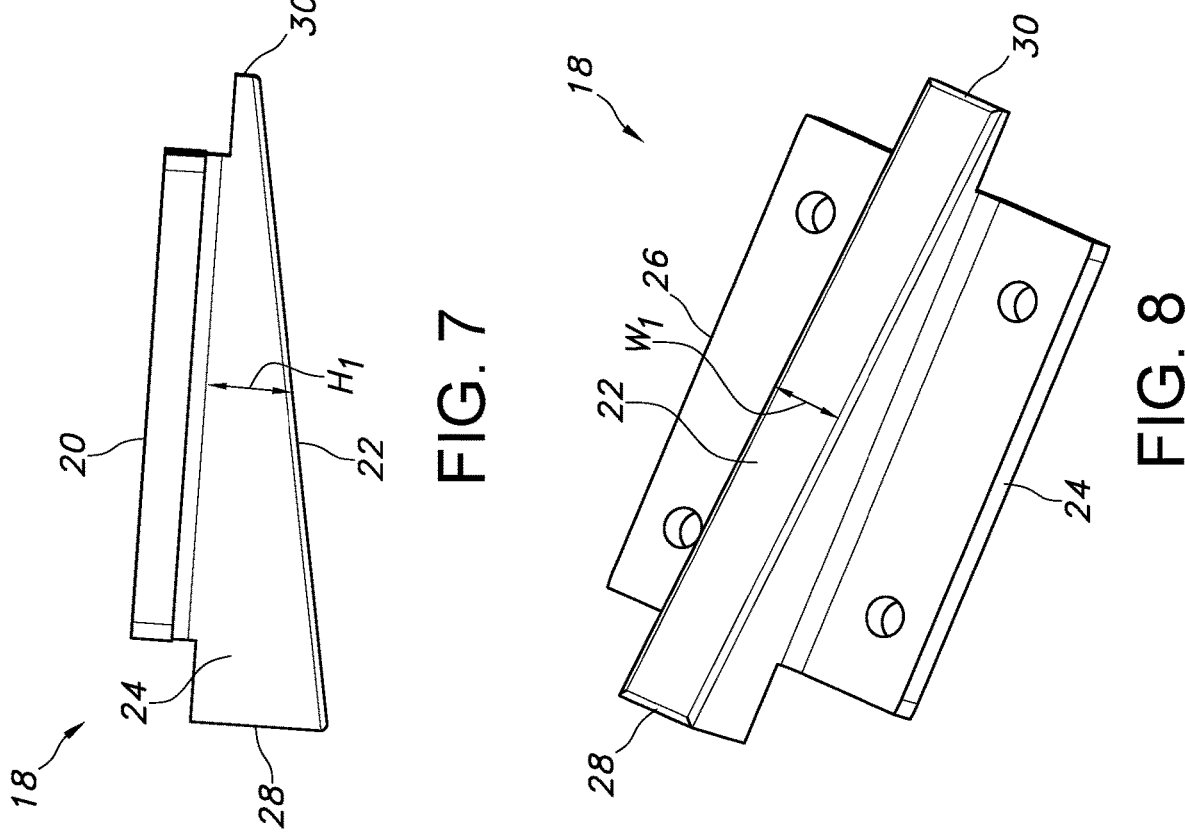
FIG. 7 is a side view of the component of the system shown in FIG. 5.
FIG. 8 is a perspective view of the component of the system shown in FIG. 5.
Figure 10:
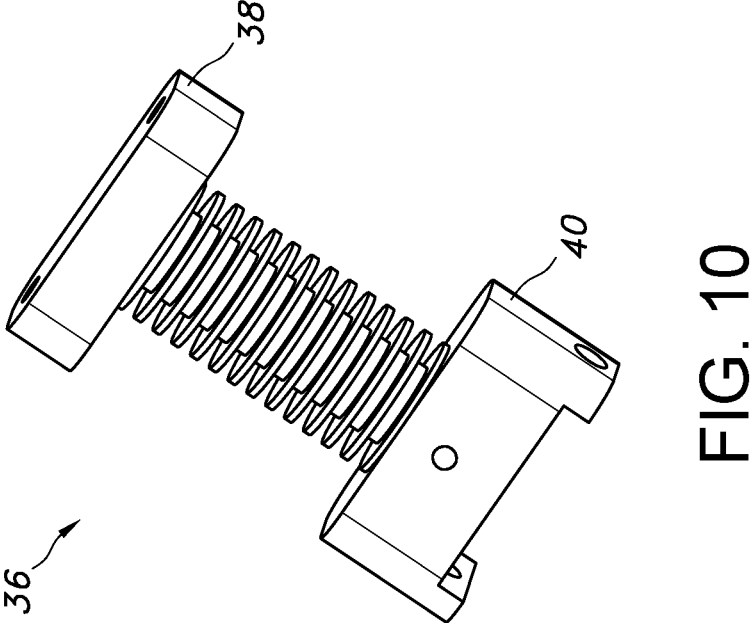
FIG. 10 is a perspective view of a component of the system shown in FIG. 1.
Figure 9:
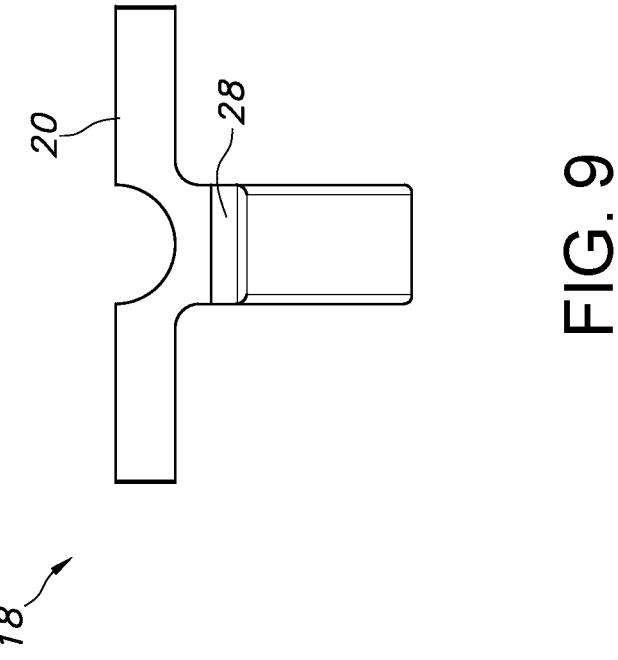
FIG. 9 is an end view of the component of the system shown in FIG. 5.
Figure 12:
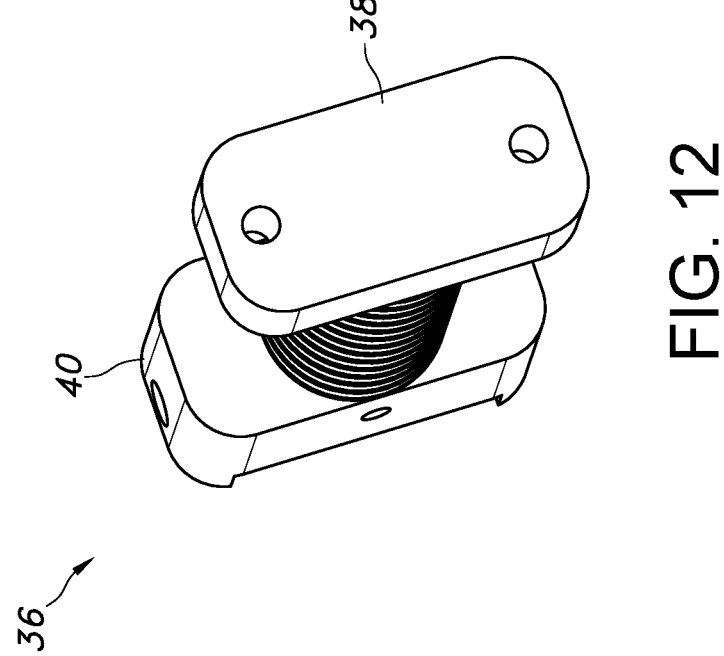
FIG. 12 is a perspective view of the component of the system shown in FIG. 10.
Figure 11:
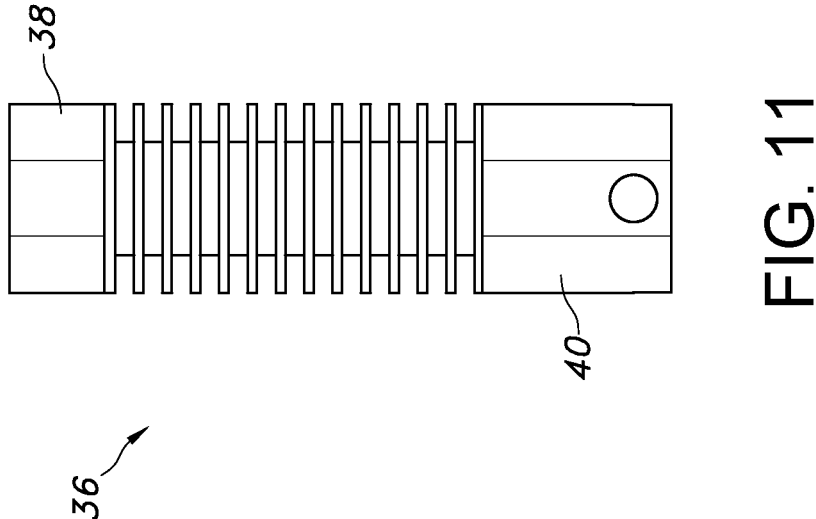
FIG. 11 is a side view of the component of the system shown in FIG. 10.

Rib 18 includes a wedge configuration. Rib 18 includes an increasing height H1 that extends from outer end 30 to end 28, shown in FIG. 7. Height H1 is configured to form a selected depth of at least one vent 104 within a surface of container 100. In some embodiments, end 28 has a height that is greater than a height of end 30. In some embodiments, the increasing height H1 extends from outer end 30 toward axis AA. In some embodiments, the increasing height H1 incrementally increases from end 30 to end 28 in a range from about 1 mm to 10 mm. Rib 18 includes a selected width W1, as shown in FIG. 8. Width W1 is configured to form a selected width of at least one vent 104 within a surface of container 100. In some embodiments, width W1 includes a width selected from a range of 1 mm to 10 mm.

In some embodiments, rib 18 may be variously configured including an oval, oblong, triangular, square, polygonal, star, round, hexagonal, pentagonal, half moon, octagonal, irregular, uniform, non-uniform, offset, staggered, and/or tapered. In some embodiments, rib 18 may be shaped to form a recessed, semi-circular configured at least one vent 104, and/or is shaped to form a saw-tooth at least one vent 104 to provide tamper evidence. In some embodiments, rib 18 is configured from one or more metals and/or high temperature resistant rubbers.

Figure 16:
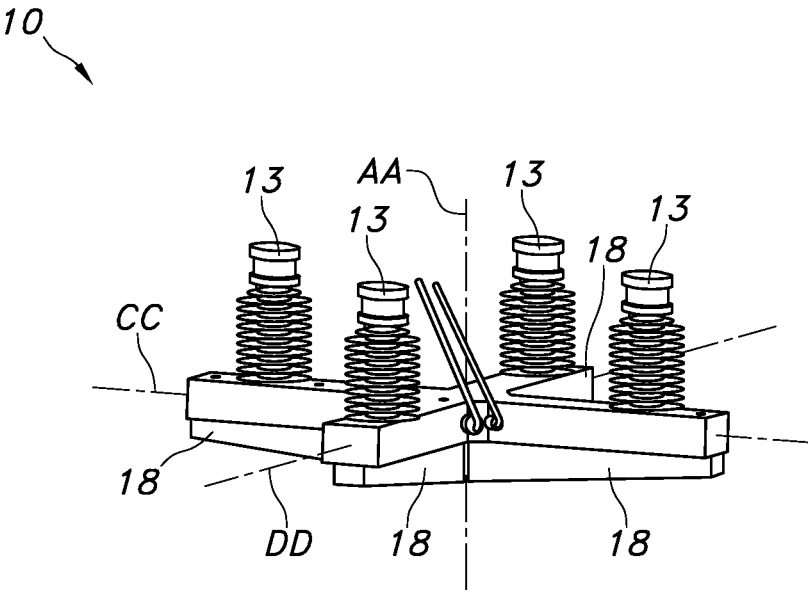
FIG. 16 is a perspective view of components of the system shown in FIG. 1.
Figure 17:
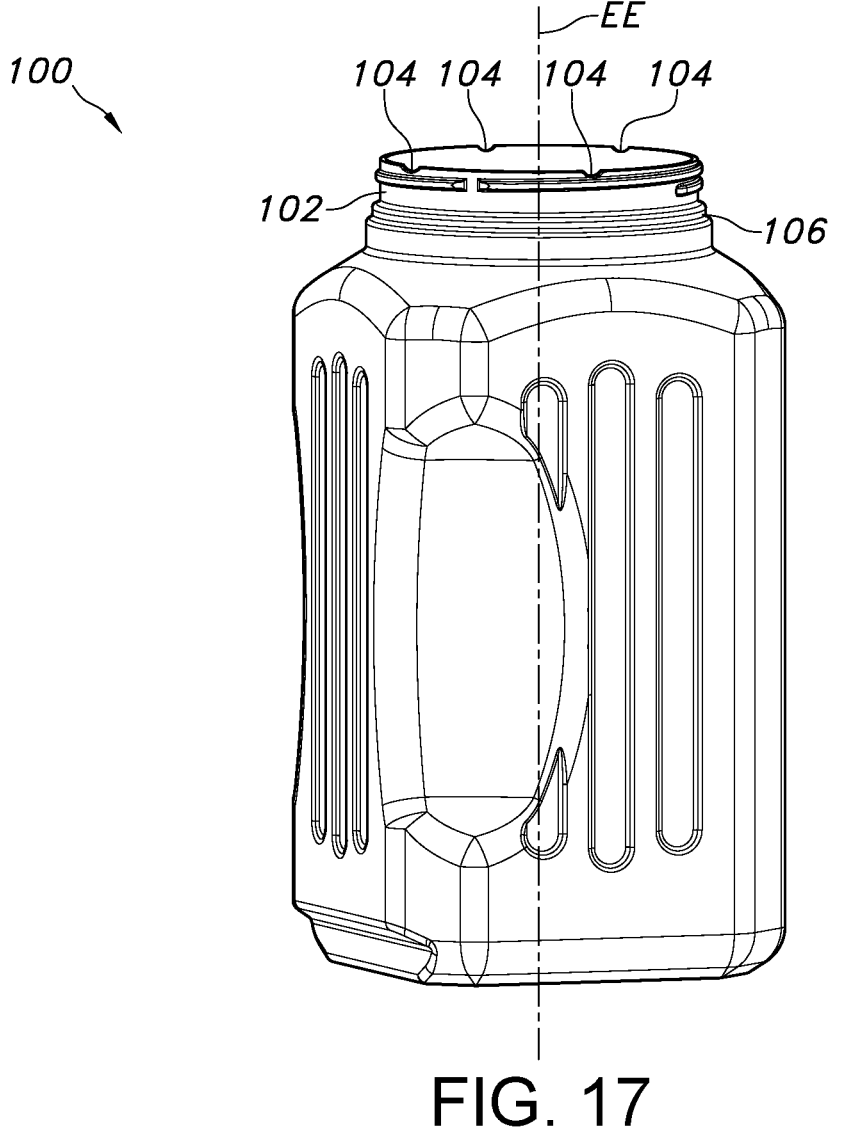
FIG. 17 is a perspective view of one embodiment of a container in accordance with the principles of the present disclosure.

In some embodiments, manufacturing device 12 includes a plurality of tools 13 including a plurality of ribs 18, for example, 4 ribs shown in FIGS. 1, 2 and 16. In some embodiments, manufacturing device 12 includes a pair of tools 13 including ribs 18 disposed along an axis CC and a pair of tools 13 including ribs 18 disposed along an axis DD oriented transverse relative to axis CC. In some embodiments, the plurality of ribs 18 are arranged radially relative to longitudinal axis AA, and the plurality of ribs 18 slope in an opposite direction relative to a central axis EE of container 100, as shown in FIG. 17.

Heater block 36 extends between an end 38 and an end 40, shown in FIGS. 10-14. End 38 is configured for engagement with an actuator 42, and end 40 is configured for engagement with top surface 20 of rib 18. In some embodiments, rib 18 is fixed with end 40 via fasteners, including screws, is pressure fit, and/or is welded.

Actuator 42, as shown in FIGS. 1 and 2, is configured to move rib 18 between a first orientation, for example, a downward direction to engage with a surface of container 100, and a second orientation, for example, an upward direction to disengage with a surface of container 100. In some embodiments, in the first orientation, rib 18 engages a surface, for example, a neck 102 of container 100 to form at least one vent 104. In some embodiments, actuator 42 is spring loaded in the first orientation via an air cylinder 44 to lift tool 13 into an idle position. In some embodiments, rib 18 is pneumatically forced to the first orientation via actuator 42. In some embodiments, actuator 42 is spring loaded and is configured to move tool 13 and rib 18 between the first orientation and the second orientation. In some embodiments, rib 18 is biased via the spring driven actuator 42 to the second orientation, as described herein.

Figures 13, 14:
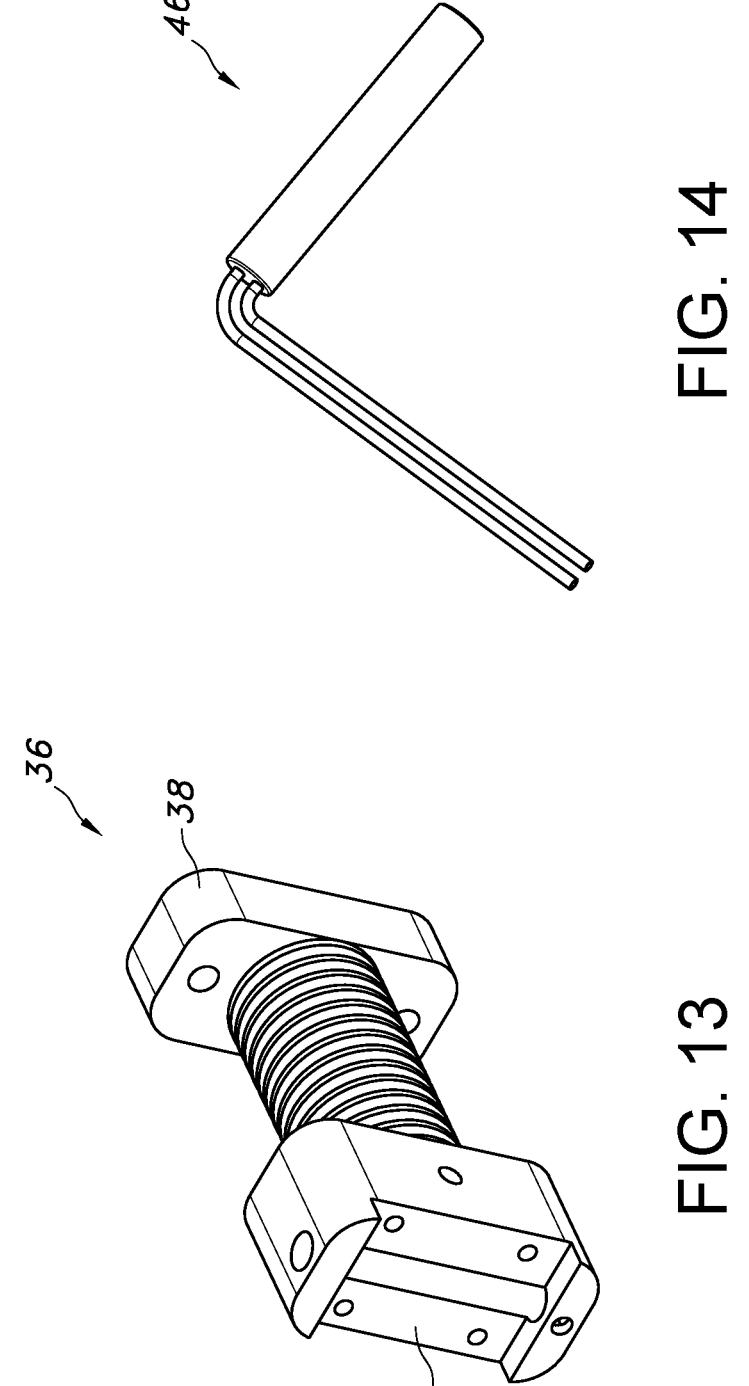
FIG. 13 is a perspective view of the component of the system shown in FIG. 10.
FIG. 14 is a perspective view of a component of the system shown in FIG. 1.
Figure 15:
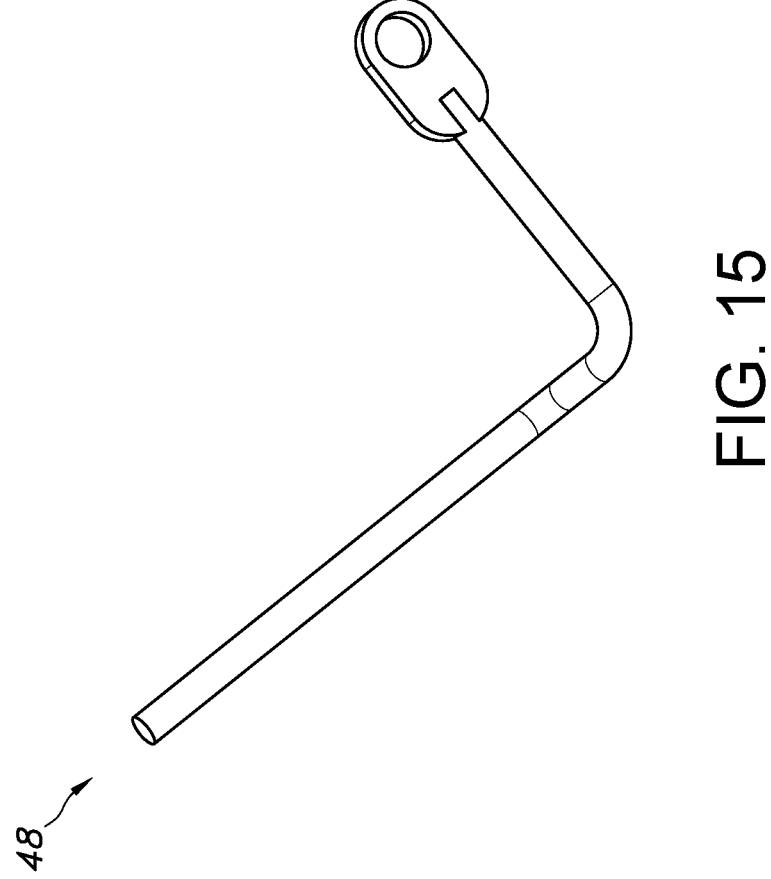
FIG. 15 is a perspective view of a component of the system shown in FIG. 1.

Manufacturing device 12 includes a heater element 46 and a thermal wire 48 configured for connection with heater block 36, shown in FIGS. 4, 14 and 15. Heater block 36, heater element 46 and thermal wire 48 are configured to heat rib 18 to facilitate the formation of at least one vent 104.

Manufacturing device 12 includes a clamp 50 engageable with container 100 to fix position of the neck with rib 18, as shown in FIG. 2. Clamp 50 includes opposing plates 52, 54 engageable with container 100 adjacent threads 106 of neck 102. Clamp 50 is configured to align neck 102 with rib 18 such that rib 18 is engageable with neck 102 to form at least one vent 104.

Figure 3:
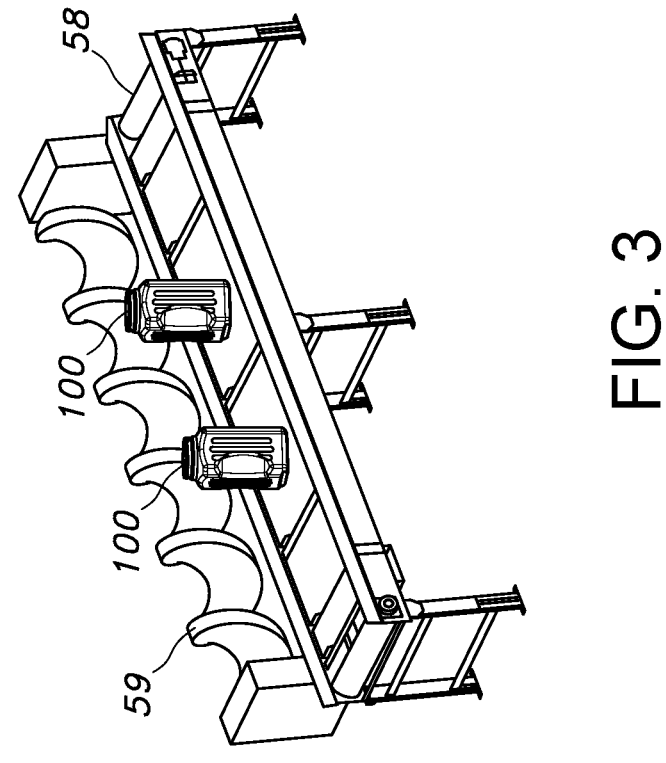
FIG. 3 is a perspective view of one embodiment of components of a container manufacturing system in accordance with the principles of the present disclosure.

In some embodiments, container manufacturing system 10 includes a conveyor 58 and a feed-screw 59, as shown in FIG. 3. Conveyor 58 and feed-screw 59 are configured to support container 100 along a selected linear path, described herein.

In some embodiments, container manufacturing system 10 includes a mold apparatus (not shown) configured to form an article (not shown). In some embodiments, the article includes a dome (not shown). In some embodiments, container manufacturing system 10 includes a trimmer (not shown) engageable with the article to remove the dome from the article to form finished container 100.

Figure 18:
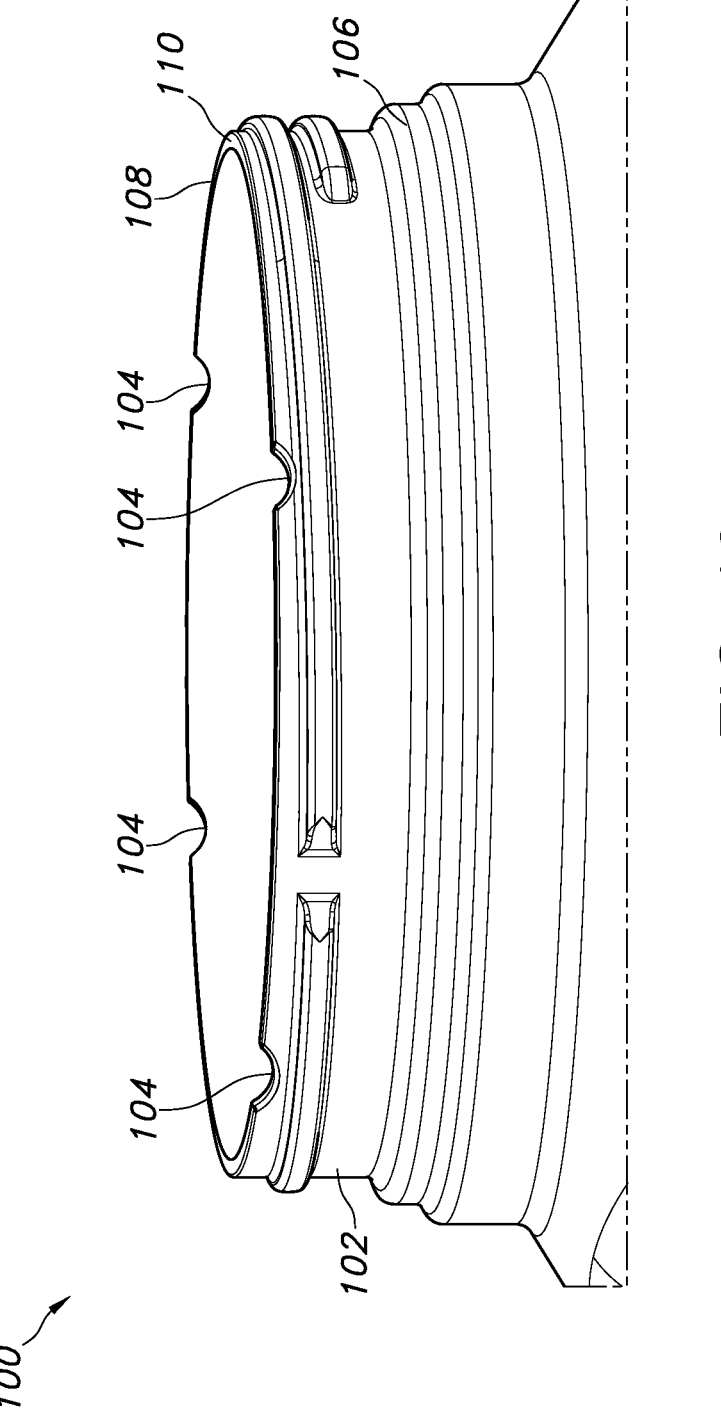
FIG. 18 is a side view of components of the container shown in FIG. 17.

In some embodiments, container 100 includes a selected volume and is configured for storing products such as food, food preparation and/or beverages. Neck 102 includes a sealing surface 108, as shown in FIG. 18. In some embodiments, rib 18 is configured to form at least one vent 104 in sealing surface 108. Sealing surface 108 is configured for sealing engagement with a closure (not shown). Sealing surface 108 includes a lip 110. In some embodiments, at least one vent 104 is disposed about lip 110 and is configured for passage of a gas. The pressurized gas exits through at least one vent 104 from inside of container 10 when container 10 is sealed via a closure (not shown). In some embodiments, the pressurized gas passes through at least one vent 104, and releases into atmosphere external to container 100.

In some embodiments, rib 18 may form at least one vent 104 at alternate orientations, relative to neck 102 and/or sealing surface 108, for example, parallel, transverse and/or angular orientations such as acute or obtuse, coaxial and/or may be offset or staggered. In some embodiments, at least one vent 104 may be variously configured including an oval, oblong, triangular, square, polygonal, star, round, hexagonal, pentagonal, half moon, octagonal, irregular, uniform, non-uniform, offset, staggered, and/or tapered. In some embodiments, at least one vent 104 may be in a recessed, semi-circular configuration, and/or is shaped in a saw-tooth configuration to provide tamper evidence.

In some embodiments, neck 102 and/or sealing surface 108 includes one or more vents 104, including a plurality of vents 104. In some embodiments, the one or more vents 104 are variously dimensioned and include, but are not limited to a length from about 1 mm to about 10 mm, a height from about 1 mm to about 10 mm and/or a depth from about 1 mm to about 10 mm. In some embodiments, neck and/or sealing surface 108 may include a plurality of vents 104 in a range of 1 to 20 vents.

In some embodiments, container 100 is made from PET. In some embodiments, container 100 may be fabricated from plastic. In some embodiments, container 100 may be fabricated from polyester (PES), polyethylene (PE), high-density polyethylene (HDPE), polyvinyl chloride (PVC), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU). In some embodiments, container 100, as described herein, can be fabricated from materials suitable for food packaging products. In some embodiments, such materials include synthetic polymers such as thermoplastics, semi-rigid and rigid materials, elastomers, fabric and/or their composites.

A finished container 100 is manufactured for use with a selected application, as described herein. In some embodiments, the selected application includes food, food preparation products, viscous and/or beverage products.

Figure 19:
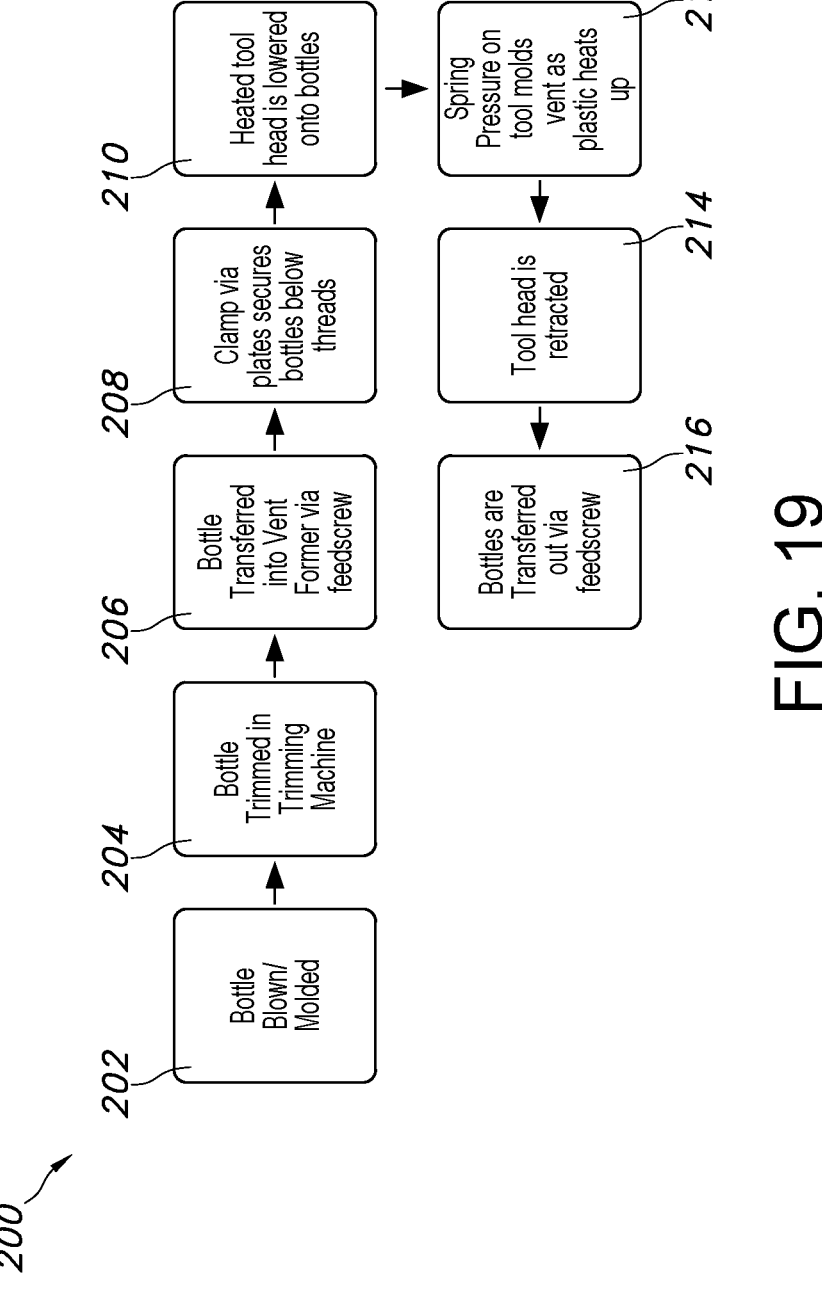
FIG. 19 is a flowchart illustrating the steps of a method of making a container in accordance with the principles of the present disclosure.

In some embodiments, a method of manufacturing 200 a container, for example, container 100 is provided, as shown in FIG. 19. The method includes the step (202) of forming container 100, for example, via blow molding. In a step (204), container 100 is trimmed in a trimming machine (not shown). In a step (206), container 100 is transferred into manufacturing device 12 via a feed-screw 59 and a conveyor 58. In a step (208), container 100 is secured to clamp 50 via plates 52, 54. In some embodiments, container 100 is secured to plates 52, 54 below threads 106 of container 100. In a step (210), at least one vent 104 is formed with a heated tool, for example, tool 13 including rib 18. In a step (212), rib 18 of tool 13 is translated to contact a portion of container 100 and spring pressure applied to tool 13 to mold at least one vent 104 into the surface of container 100 as tool 13 is heated. In some embodiments, manufacturing device 12 includes four tools 13, each including a rib 18 such that four vents 104 are molded into container 100, as shown in FIGS. 17 and 18. In a step (214), tool 13 is retracted. In a step (216), container 100 is transferred out of manufacturing device 12 via feed-screw 59 and conveyor 58.

In some embodiments, a method for manufacturing a packaging container, for example, container 100 includes the step of molding an article (not shown) having a selected configuration and including a body defining a volume, a neck and a dome. The method includes the step of trimming the article via a trimmer to remove the dome to form a finished container, for example, container 100. The method includes the step of aligning container 100 with manufacturing device 12 including tool 13. The method includes the step of engaging rib 18 with neck 102 to form at least one vent 104.

In some embodiments, the step of engaging includes forming at least one vent 104 within sealing surface 108 of neck 102 to create a vent pathway to the volume. In some embodiments, actuator 42 is configured to move rib 18 between the first orientation, for example, a downward direction to engage with a surface of container 100, and a second orientation, for example, an upward direction to disengage with a surface of container 100. Rib 18 is configured to move between the first orientation and the second orientation such that rib 18 engages neck 102 to form at least one vent 104.

In some embodiments, rib 18 is pneumatically forced to the first orientation. In some embodiments, rib 18 is biased to the second orientation. In some embodiments, clamp 50 is engageable with container 100 to fix position of neck 102 with rib 18. In some embodiments, plates 52, 54 of clamp 50 are engageable with the container 100 adjacent threads 106 of neck 102.

In some embodiments, the method includes the step of transferring container 100 to manufacturing device 12 along a linear path via feed-screw 59 and conveyor 58, shown in FIG. 3.

In some embodiments, a method for manufacturing a packaging container, for example container 100 includes the step of molding an article (not shown) having a selected configuration and including a body defining a volume, a neck having a sealing surface and a dome. The method includes the step of trimming the article to remove the dome to form finished container 100. The method includes the step of transferring container 100 to manufacturing device 12 along a linear path via feed-screw 59 and conveyor 58. In some embodiments, manufacturing device 12 includes actuator 42 configured to move the plurality of ribs 18. The method includes the step of aligning sealing surface 108 with the plurality of ribs 18. In some embodiments, the method includes the step of engaging the plurality of ribs 18 with sealing surface 108 to form a plurality of vents 104.

In some embodiments, container manufacturing system 10 includes tool 13 that is mounted to an external frame 60 of manufacturing device 12 via adjustable mounts to allow for varying container 100 dimensions. In some embodiments, frame 60 incorporates external guarding and doors 62 that include safety switches 64, as shown in FIG. 1. In some embodiments, manufacturing device 12 includes servos, solenoids, sensors, and safety devices that are controlled by a PLC incorporated into line controls. In some embodiments, manufacturing device 12 is employed in line on a standard PET blow-trim line. In some embodiments, manufacturing device 12 overlaps feed-screw 59 and conveyor 58 and is in line after a trimmer. In some embodiments, manufacturing device 12 is fully automated and includes in line controls and will activate when a selected amount of backlog is present and will shut down if there is a jam on the line, if there is not enough backlog, or if there is not enough room on a discharge side of manufacturing device 12. In some embodiments, once proper conditions are met, manufacturing device 12 will automatically load, clamp, vent, and then discharge containers 100.

In some embodiments, a programmable logic controller (PLC) is implemented to control timing and duration of actuations performed by one or more components of container manufacturing system 10. In some embodiments, container manufacturing system 10 includes one or more machines including a continuous rotational machine, a rotary index machine, and/or a continuous motion linear machine. In some embodiments, rotary equipment is configured to facilitate a higher throughput of the machine for a selected number of ribs 18. In some embodiments, the feed-screw 59 mechanism is substituted with an alternative loading mechanism, including a belt drive, servo driven conveyor, or photo-eye driven stop gates. In some embodiments, clamp 50 may or may not be employed depending on precision required for vent locations and can be driven by other methods such linear servos, belt drives, and/or toggle locks. In some embodiments, manufacturing device 12 includes a drive mechanism that can be actuated by varying methods. In some embodiments, tool 13 is variously configured in different shapes and rib 18 is pushed into a finish of container 100.

In some embodiments, during manufacture, container 100 is filled with food and/or beverage products at a fill site utilizing automated fill equipment. In some embodiments, the food and/or beverage products are hot due to high temperatures in the fill and pasteurization of the products. Positive pressure is induced in all directions inside container 100 when container 100 is filled with the food and/or beverage products. In some embodiments, container 100 is capable of maintaining an initial shape at an elevated pressure of greater than 3 pounds per square inch (psi) and withstands a vacuum draw of greater than 3 In Hg during filling of container 100 with hot food and/or beverage products.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for manufacturing a packaging container, the method comprising the steps of:
   molding an article having a selected configuration and including a body defining a volume, a neck and a dome;
   trimming the article to remove the dome to form a finished container;
   aligning the finished container with a device having at least one heated rib; and
   engaging the at least one heated rib with the neck to form at least one vent,
   wherein the device defines a central longitudinal axis and the at least one heated rib includes an increasing height extending from an outer end of the at least one heated rib toward the central longitudinal axis.

2. The method recited in claim 1, wherein the step of engaging includes forming the at least one vent within a sealing surface of the neck to create a vent pathway to the volume.

3. The method recited in claim 1, wherein the at least one heated rib includes a wedge configuration having a selected width.

4. The method recited in claim 3, wherein the selected width includes a width selected from a range of 1 mm to 10 mm.

5. The method recited in claim 1, wherein the at least one heated rib includes a plurality of heated ribs.

6. The method recited in claim 1, wherein the at least one heated rib includes a first pair of heated ribs disposed along a first axis and a second pair of heated ribs disposed along a second axis oriented transverse relative to the first axis.

7. The method recited in claim 6, wherein the second axis is perpendicularly oriented relative to the first axis.

8. The method recited in claim 1, wherein the device includes an actuator configured to move the at least one heated rib between a first orientation and a second orientation such that the at least one heated rib engages the neck to form the at least one vent.

9. The method recited in claim 8, wherein the at least one heated rib is pneumatically forced to the first orientation.

10. The method recited in claim 8, wherein the at least one heated rib is biased to the second orientation.

11. The method recited in claim 1, wherein the device includes a clamp engageable with the finished container to fix position of the neck with the at least one heated rib.

12. The method recited in claim 11, wherein the clamp includes opposing plates engageable with the finished container adjacent threads of the neck.

13. The method recited in claim 1, further comprising the step of transferring the finished container to the device along a linear path via a feed-screw.

14. The method recited in claim 1, further comprising the step of transferring the finished container to the device along a linear path via a conveyor.

15. A method for manufacturing a packaging container, the method comprising the steps of:

molding an article having a selected configuration and including a body defining a volume, a neck having a sealing surface and a dome;

trimming the article to remove the dome to form a finished container;

transferring the finished container to a device along a linear path via a feed-screw and a conveyor, the device having a plurality of heated ribs and an actuator configured to move the plurality of ribs;

aligning the sealing surface with the plurality of ribs; and engaging the plurality of ribs with the sealing surface to form a plurality of vents, wherein the device defines a central longitudinal axis and the plurality of heated ribs each include an increasing height extending from an outer end of a respective one of the plurality of heated ribs toward the central longitudinal axis.

16. A method for manufacturing a packaging container, the method comprising the steps of:

forming a finished container including a body and a neck;

aligning the finished container with a device having at least one heated rib; and engaging the at least one heated rib with the neck to form at least one vent, wherein the device defines a central longitudinal axis and the at least one heated rib includes an increasing height extending from an outer end of the at least one heated rib toward the central longitudinal axis.

17. The method recited in claim 16, wherein the step of engaging includes forming the at least one vent within a sealing surface of the neck to create a vent pathway to a volume of the body.

18. The method recited in claim 16, wherein the at least one heated rib includes a wedge configuration having a selected width.

19. The method recited in claim 18, wherein the selected width includes a width selected from a range of 1 mm to 10 mm.

20. The method recited in claim 16, wherein the at least one heated rib includes a first pair of heated ribs disposed along a first axis and a second pair of heated ribs disposed along a second axis oriented transverse relative to the first axis.

\* \* \* \* \*